(12) United States Patent
Gao (10) Patent No.: US 12,046,730 B2
(45) Date of Patent: Jul. 23, 2024

(54) ENERGY STORAGE CELL PACKAGING AND SYSTEM WITH ACCELERATION DESIGN

(71) Applicant: Baidu USA LLC, Sunnyvale, CA (US)

(72) Inventor: Tianyi Gao, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 247 days.

(21) Appl. No.: 17/678,305

(22) Filed: Feb. 23, 2022

(65) Prior Publication Data

US 2023/0268578 A1 Aug. 24, 2023

(51) Int. Cl.
*H01M 10/63* (2014.01)
*H01M 10/46* (2006.01)
*H01M 10/613* (2014.01)
*H01M 10/627* (2014.01)
*H01M 10/6568* (2014.01)

(52) U.S. Cl.
CPC .......... *H01M 10/63* (2015.04); *H01M 10/46* (2013.01); *H01M 10/613* (2015.04); *H01M 10/627* (2015.04); *H01M 10/6568* (2015.04); *H01M 2220/10* (2013.01)

(58) Field of Classification Search
CPC .... H01M 10/63; H01M 10/46; H01M 10/613; H01M 10/627; H01M 10/6568; H01M 2220/10; H01M 10/486; H01M 2220/20; H01M 2010/4271; H01M 10/625; H01M 10/6563; H01M 10/6567; Y02E 60/10
See application file for complete search history.

(56) References Cited

U.S. PATENT DOCUMENTS

| | | | | |
|---|---|---|---|---|
| 2012/0003515 | A1* | 1/2012 | Eisenhour | ......... H01M 10/6571 429/62 |
| 2014/0065461 | A1* | 3/2014 | Kountz | .................. C09K 21/14 429/120 |
| 2014/0335381 | A1* | 11/2014 | Krolak | ............. H01M 10/0525 429/50 |
| 2015/0188203 | A1* | 7/2015 | Enomoto | .............. H01M 50/24 429/83 |
| 2017/0005381 | A1* | 1/2017 | Harris | ................. H01M 50/581 |
| 2018/0233791 | A1* | 8/2018 | Tong | ................... H01M 10/625 |

FOREIGN PATENT DOCUMENTS

| | | | |
|---|---|---|---|
| CN | 207624860 | * | 7/2018 |
| CN | 112820980 | * | 5/2021 |
| CN | 114267907 | * | 4/2022 |
| JP | 2021125411 | * | 8/2021 |

* cited by examiner

*Primary Examiner* — Lisa S Park
(74) *Attorney, Agent, or Firm* — WOMBLE BOND DICKINSON (US) LLP (57) ABSTRACT

A cooling system includes a container and a number of battery packaging modules submerged in a first coolant fluid contained in the container. The cooling system includes a supply channel and a return channel coupled respectively to at least a supply end and at least a return end of the battery packaging modules to accelerate a second coolant fluid through any of the battery packaging modules. The cooling system includes one or more pairs of fluid valves secured to the supply and return channels, each pair to control the second coolant fluid flowing through a subset of the plurality of battery packaging modules. The cooling system includes a fluid pump disposed at the channels to accelerate the second coolant fluid supplied to any of the battery packaging modules which are in activated modes.

13 Claims, 8 Drawing Sheets

ENERGY STORAGE CELL PACKAGING AND SYSTEM WITH ACCELERATION DESIGN

FIELD OF THE INVENTION

Embodiments of the present invention relate generally to data center and energy storage cooling. More particularly, embodiments of the invention relate to energy storage cell packaging and system with acceleration design.

BACKGROUND

Cooling is a prominent factor in a computer system and data center design. The number of high performance electronics components such as high performance processors packaged inside servers has steadily increased, thereby increasing the amount of heat generated and dissipated during the ordinary operations of the servers.

The power backup systems in a data center is just as critical. Power backup systems supply power to the servers in the data center in order to provide backup power when there is a failure in the utility power supply. For example, when the utility power supply is offline, power is typically supplied to the servers by discharging the energy storage modules such as battery modules in the backup power system. When the utility power supply is online, the energy storage modules are recharged by the utility power supply. The discharge/recharge cycles generate a large amount of heat spots at the energy storage modules, especially for fast charging/discharging, high density battery modules.

The previous cooling solutions for battery modules consists of air cooling or liquid cooling. These solutions may not enable fast charging/discharging, high power density, and high packaging densities.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Reference in the specification to "accelerated coolant" or "acceleration coolant" means an immersion coolant (such as dielectric solution) fluid that is moved at an accelerated flow rate configurable by an active flow management system. "Immersion coolant" means an immersion coolant fluid that is not moving or moving at a slower predetermined flow rate. "Cooling liquid" means a non-immersion type of cooling liquid.

The proposed cooling system includes a thermal management design for battery packaging modules to accelerate single phase immersion coolant to cool the battery packaging modules selectively.

According to a first aspect, a cooling system includes a coolant container and a number of battery packaging modules submerged in a first coolant fluid contained in the coolant container. The cooling system includes a supply channel and a return channel coupled respectively to at least a supply end and at least a return end of the plurality of battery packaging modules to accelerate a second coolant fluid through any of the plurality of battery packaging modules. The cooling system includes one or more pairs of fluid valves secured to the supply and return channels, each pair having a first fluid valve coupled between the supply channel and a supply end of a battery packaging module and a second fluid valve coupled between the return channel and a return end of the battery packaging module. The cooling system includes a fluid pump disposed at the supply channel to accelerate the second coolant fluid supplied to any of the plurality of battery packaging modules. Each of the plurality of the battery packaging modules includes a battery chassis having a pair of openings situated at opposing sides of the battery chassis, a battery spacing in the battery chassis for one or more battery cells to be housed therein, and a sensor coupled to the one or more battery cells, the sensor configured to detect a discharge or a charge of the one or more battery cells to control corresponding pair of fluid valves and an opening of the pair of fluid valves enables the second coolant fluid to pass through the one or more battery cells in the battery packaging module, where the sensor is further configured to control the fluid pump.

In one embodiment, the fluid pump is operable at a constant speed or is operable at a variable speed that is proportional to a quantity of battery cells that are in a discharging or charging mode.

In one embodiment, the fluid pump is operable at a constant speed if battery packs of the plurality of battery packaging modules are operating in series discharging or charging mode and the plurality of battery packaging modules correspond to a single server load, or the fluid pump is operable at the variable speed if battery packs of the plurality of battery packaging modules are operating in parallel discharging or charging mode and each of the plurality of battery packaging modules corresponds to one of a plurality of server loads.

In one embodiment, the first coolant fluid is an immersion coolant and the second coolant fluid is an acceleration coolant. In one embodiment, the first and the second fluid are a same or a different coolant fluid.

In one embodiment, the plurality of battery packaging modules are arranged vertically and coolant flow directions of the plurality of battery packaging modules are perpendicular to flow directions of the supply and return channels, or a subset of the plurality of battery packaging modules are arranged horizontally and coolant flow directions of the subset of the plurality of battery packaging modules are parallel to flow directions of the supply and return channels.

In one embodiment, the plurality of battery packaging modules are arranged in a two dimensional grid comprising one or more subsets of battery packaging modules, wherein each subset is arranged in a vertical manner, and each battery packaging module of the subset is arranged in a horizontal manner.

In one embodiment, the battery packaging modules are operable to power server electronics of an information technology (IT) system or are operable as a backup power source for the server electronics.

In one embodiment, one or more of the battery packs in the battery packaging modules are operable to power the fluid pump.

In one embodiment, each battery packaging module includes a corresponding set of packaging fluid valves secured to one or more openings of the cell packaging chassis of the battery packaging module.

According to a second aspect, a system sets a fluid pump to an initial speed. The system detects, by one or more sensors, a charging or discharging process being performed by a battery pack of any one of a plurality of battery packaging modules submersible in a first coolant fluid. In response to detecting the charging or discharging process corresponds to a battery packaging module, the system opens a pair of fluid valves of the battery packaging module to enable a second coolant fluid that is accelerated by the fluid pump to pass through one or more battery cells contained in the battery packaging modules. In response to determining that the battery packaging module is operating in a series discharging or charging mode, the system sets the fluid pump to a constant speed. In response to determining that the battery packaging module is operating in a parallel discharging or charging mode, the system sets the fluid pump to a variable speed. In response to detecting none of a plurality of battery packaging modules are operating in a charging or discharging process, the system sets the fluid pump to the initial speed.

Figure 1:
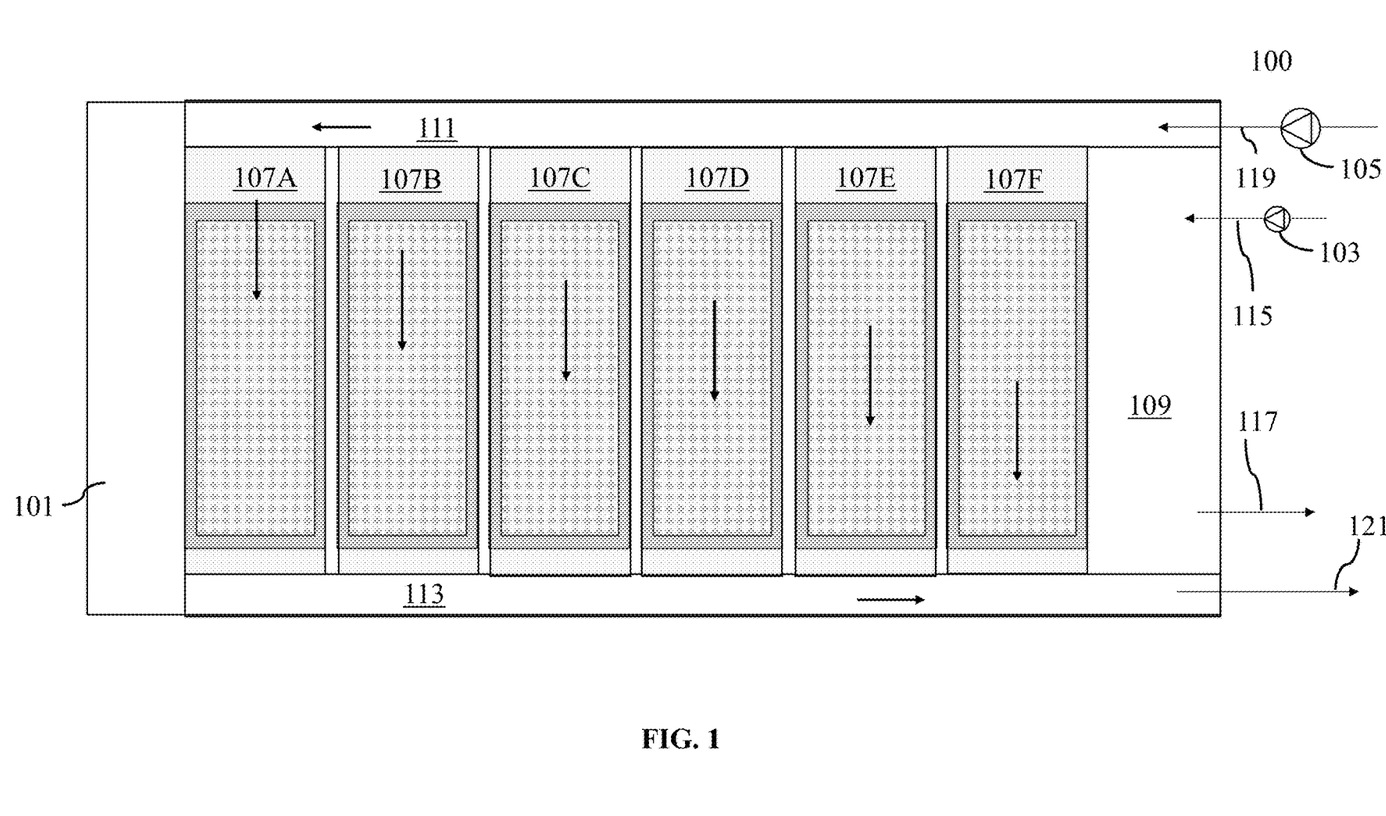
FIG. 1 is a block diagram illustrating a cooling system having one or more energy storage cell packages according to one embodiment.

FIG. 1 is a block diagram illustrating a cooling system 100 having one or more energy storage cell packages according to one embodiment. Cooling system 100 is based on an immersion tank design having tank/container 101. In one embodiment, system 100 includes acceleration channels 111 and 113 situated at two sides of container 101. In between the acceleration channels 111 and 113 is a battery spacing 109. Battery spacing 109 can house one or more battery packaging modules 107A-107F. In one embodiment, battery packaging modules 107A-107F are arranged adjacent to each other vertically and a flow direction of coolant in the battery packing modules is perpendicular to a flow direction of coolant in the acceleration channel. Although six battery packaging modules are shown, cooling system 100 can contain any number of battery packaging modules.

In one embodiment, cooling system 100 includes fluid pump 103. Fluid pump 103 can circulate an immersion coolant at battery spacing 109, where immersion coolant can enter battery spacing 109 from supply line 115 and exit at return line 117. Fluid pump 103 can be used for managing and circulating the immersion coolant within the container 101. Fluid pump 103 can provide a proper thermal environment to store battery cells and/or provide thermal management for a low thermal output/power scenario, such as, when the battery is charging. During a charging period, only a minimal amount of heat is generated, and acceleration coolant in local acceleration channels may not needed to be activated.

In one embodiment, cooling system 100 includes fluid pump 105. Fluid pump 105 can be an external pump that accelerates an acceleration coolant at acceleration channels 111 and 113 via supply line 119 and return line 121. The acceleration coolant can circulate individual battery packaging modules selectively via supply acceleration channel 111 and return acceleration channel 113, as further described in FIG. 2. In one embodiment, the immersion coolant and the acceleration coolant are different coolants having different fluid viscosities. For example, the acceleration coolant can have a higher fluid viscosity than that of the immersion coolant. In another embodiment, the immersion coolant and acceleration coolant are a same coolant.

Figure 2:
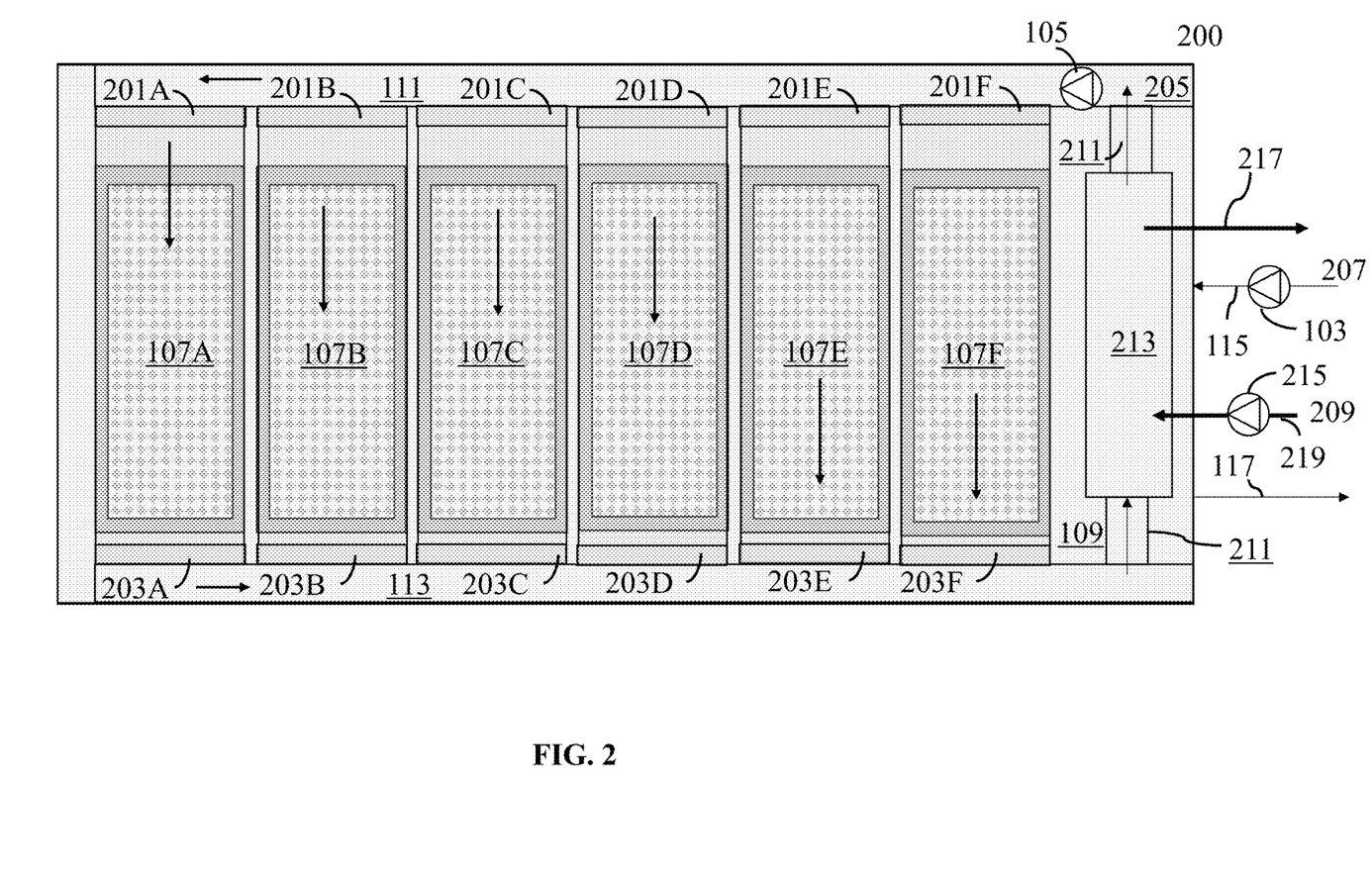
FIG. 2 is a block diagram illustrating a cooling system with two sources of cooling according to one embodiment.

FIG. 2 is a block diagram illustrating a cooling system 200 with two sources of cooling according to one embodiment. Cooling system 200 can represent cooling system 100 of FIG. 1. As shown, cooling system 200 can include a cooler 213 as a cooling source, the cooler 213 connected with the acceleration channels 111 and 113, via connecting channels 211. The cooler 213 can be packaged with acceleration coolant 205 together with the acceleration channels 111 and 113 and the acceleration coolant 205 can be accelerated via internal pump 105, where that acceleration coolant 205 is fully contained between the cooler 213 and the acceleration channels 111/113.

In one embodiment, cooler 213 is coupled to fluid lines 217/219 and is provided cooling fluid 209 (such as water) from the fluid lines 217/219 via pump 215. The cooling fluid 209 can be directed through cooling coils (not shown) of cooler 213 to cool the acceleration coolant 205 that enters cooler 213.

In one embodiment, cooling system 200 includes fluid pump 103 that can circulate the immersion coolant 207 through battery spacing 109, where the immersion coolant 207 can enter battery spacing 109, via pump 103 from supply line 115 and exit at return line 117.

In another embodiment, battery packaging modules 107A-F are designed as fully sealed or partially sealed (e.g., to minimize maintenance and operation costs) and the fluid circulating within the acceleration channels 111/113 and the battery spacing 109 can be different or a same fluid.

As shown, battery packaging modules 107A-F can be arranged adjacent and in parallel to each other, and the modules 107A-F has a form factor having a length perpendicular to a flow direction of the acceleration channels 111/113. In one embodiment, battery packs in battery packaging modules 107A-F can operate in series manner if they are designed to serve a single load. In another embodiment, battery packs in battery packaging modules 107A-F can operate in parallel if they are designed to serve multiple loads, such as multiple servers. In one embodiment, each battery pack can include one or more rows of battery cells. In one embodiment, the battery packs are used as backup power for servers of a data center.

The servers can be configured to provide IT services. Specifically, the servers may include a host server (referred to as a host node) and/or one or more compute servers (also referred to as computing nodes, such as CPU server and GPU server). The host server (having one or more CPUs) typically interfaces with clients (not shown) over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. In one embodiment, the servers can perform any type of computing task and/or can be any type of computing device (e.g., a server, a storage device, etc.). In one embodiment, the servers can be edge computing devices. Thus, while the servers provide the IT services, each of the servers can be powered by the battery packs.

Figure 3A:
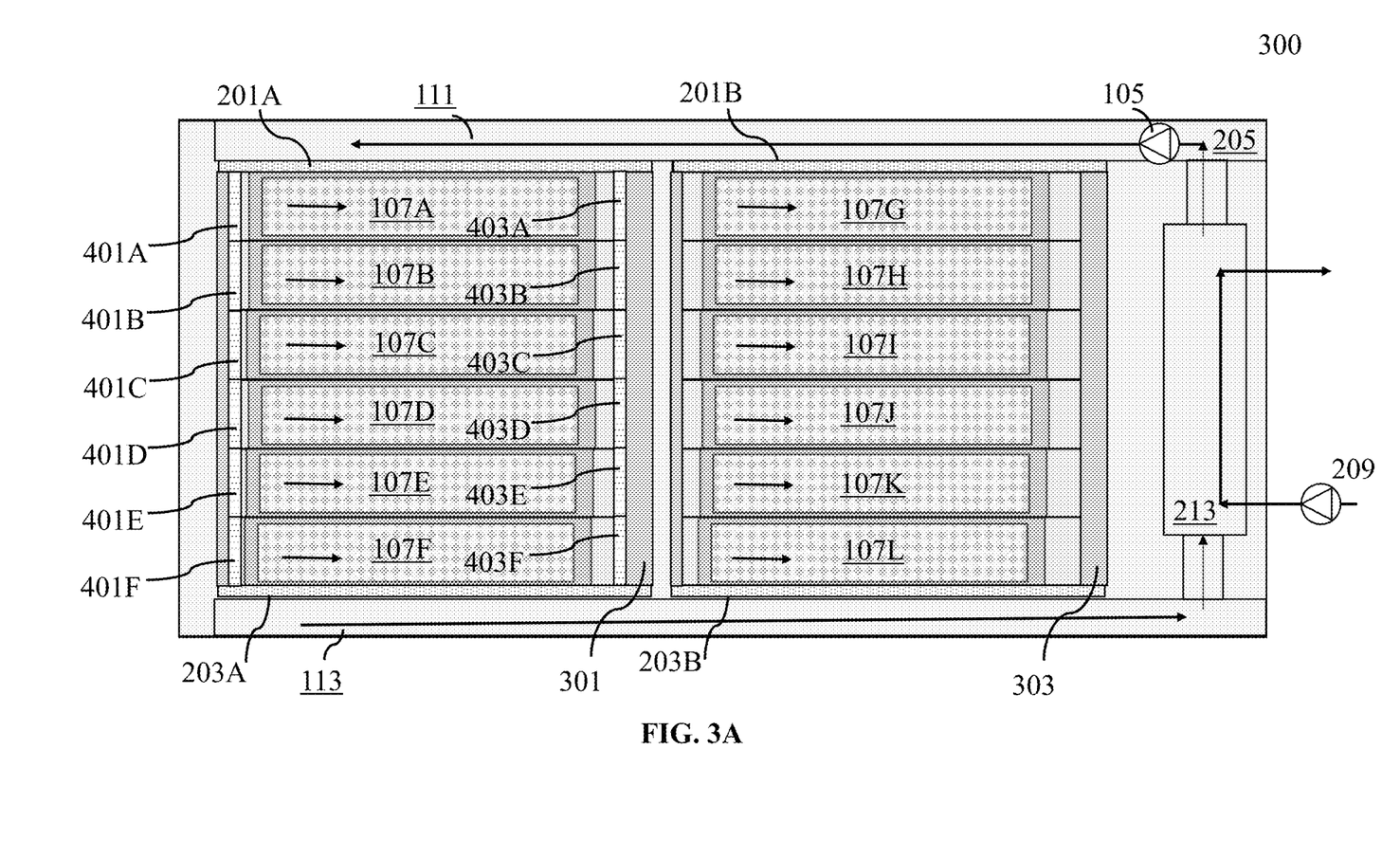
FIG. 3A is a block diagram illustrating a cooling system with cell packages arranged in parallel to acceleration channels according to one embodiment.

FIG. 3A is a block diagram illustrating a cooling system 300 with cell packages arranged in parallel to the acceleration channels according to one embodiment. Cooling system 300 can represent cooling system 100 of FIGS. 1-2. Cooling system 300 presents another arrangement for the battery packaging modules 107A-F. As shown, battery packaging modules 107A-F are arranged horizontal and a flow direction of coolant in the battery packaging modules can be parallel to a flow direction of the acceleration channels 111/113. Fluid valves 201A-201B and 203A-203B can control (e.g., open/close) a flow of acceleration coolant 205 from cooler 213 to subset chassis 301-303 that contain corresponding groups of parallel arranged battery packaging modules 107A-L, where each of battery packaging modules 107A-L contains the battery cells. The acceleration coolant 205 can be a medium to carry heat from the battery cells to cooler 213. In one embodiment, coolant fluid 209 (such as water) can be circulated to cooling coils (not shown) of cooler 213 to extract heat that is carried by acceleration coolant 205.

Figure 3B:
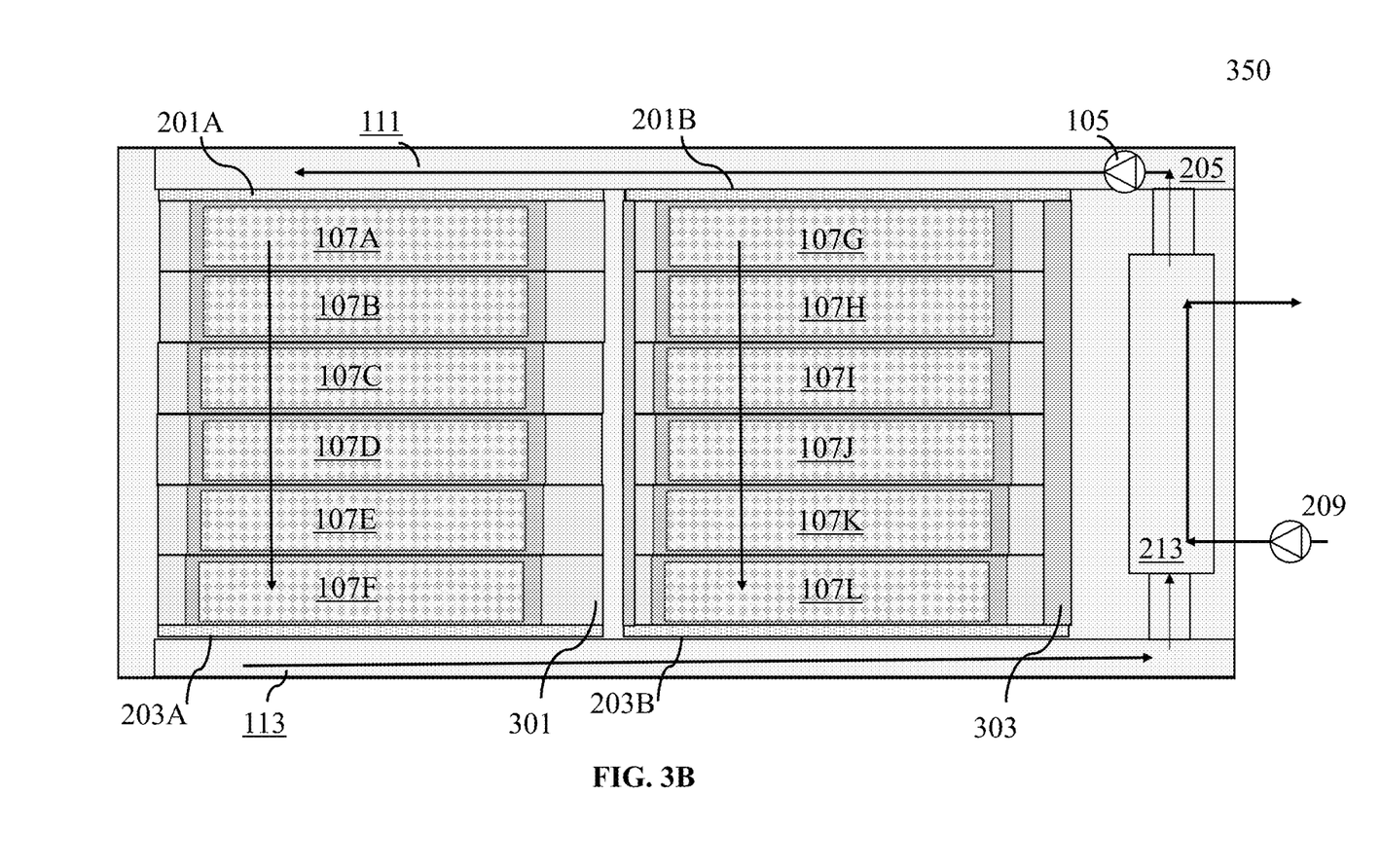
FIG. 3B is a block diagram illustrating another cooling system with cell packages arranged in parallel to acceleration channels according to one embodiment.

FIG. 3B is a block diagram illustrating a cooling system 350 with cell packages arranged in parallel to the acceleration channels according to one embodiment. Cooling system 350 can represent cooling system 300 of FIG. 3A, except the acceleration coolant flows in a direction perpendicular to the acceleration channels and across battery packs in the subsets 107A-107F and 107G-107L. For example, the subset of battery packaging modules 107A-F are arranged horizontal (stacked parallelly and adjacent to one another), and is arranged parallel to acceleration channels 111/113. The subset of battery packaging modules 107G-L are also arranged horizontal and parallel to acceleration channels 111/113. Each of battery packaging modules 107A-107L can have openings at top and bottom fashion and each of modules are stacked to adjacent battery packaging modules.

In one embodiment, the flow direction of coolant in subset 107A-107F and subset 107G-107L can each be perpendicular to a flow direction of the acceleration channels 111/113. In one embodiment, battery cells in a subset are configured to discharge in a sequence based on identifiers of the battery packaging modules in the subset and the identifiers can be the flow direction. For example, coolant flows from 107A to 107F, and 107G to 107L. Battery cells are discharging in the sequence of 107A to 107F, and 107G to 107L. At the same time, coolant running through 107A to 107F, and 107G to 107L can be constant speed corresponding to a steady power charging/discharging thermal requirement from each subset. In one embodiment, battery cells in modules 107A can discharge at time 0 to 5 minutes, battery cells in modules 107B can discharge at time 5 to 10 minutes, and so forth, until battery cells in modules 107F are discharged. At the same time, battery cells in modules 107G can discharge at time 0 to 5 minutes, battery cells in modules 107H can discharge at time 5 to 10 minutes, and so forth, until battery cells in modules 107L are discharged.

In one embodiment, system 300 can be configured to operate battery cells in the parallel arranged battery packaging modules 107A-107F independently, where each battery packaging module contains battery cells serving a particular server load. In this case, battery packaging modules 107A-107F can include corresponding sets of fluid valves 401A-401F, 403A-403F along opposite portions (opposite sides, or top/bottom sides) of corresponding battery packaging modules 107A-107F. Fluid valves 201A and 203A can control acceleration coolant to subset chassis 301 for battery packaging modules 107A-107F, while the sets of fluid valves 401A-401F, 403A-403F can control a flow of acceleration coolant to a corresponding battery packaging module in the subset chassis 301.

In one embodiment, the system can be optimized to operate the parallel arranged battery cells in battery packaging modules 107G-107L in a series manner, e.g., the group of battery packaging modules 107G-L may be dedicated for one load. In this case, fluid valves 201B and 203B can control acceleration coolant to subset chassis 303 for battery packaging modules 107G-107L. In one embodiment, battery packaging modules 107G-L can have corresponding sets of fluid valves (not shown) at opposite sides that are always open or battery packaging modules 107G-L can be configured without corresponding fluid valves.

Thus, battery packaging modules 107A-L can be arranged in a two dimensional grid comprising one or more groupings of battery packaging modules arranged in a series manner, and each grouping comprising one or more battery packaging modules arranged in a parallel manner. The battery cells contained in any one, or a combination, of the battery packaging modules 107A-L can be configured to operate in a series manner or in a parallel manner to serve server loads.

Figure 4A:
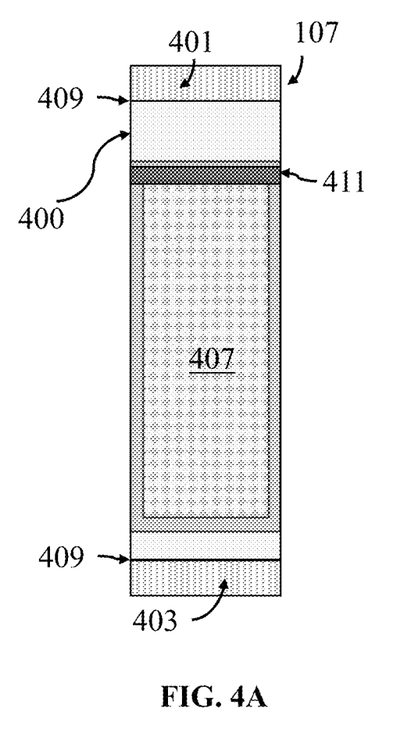
FIGS. 4A-4B is a top view and a side view illustrating an energy storage cell packaging module according to one embodiment.
Figure 4B:
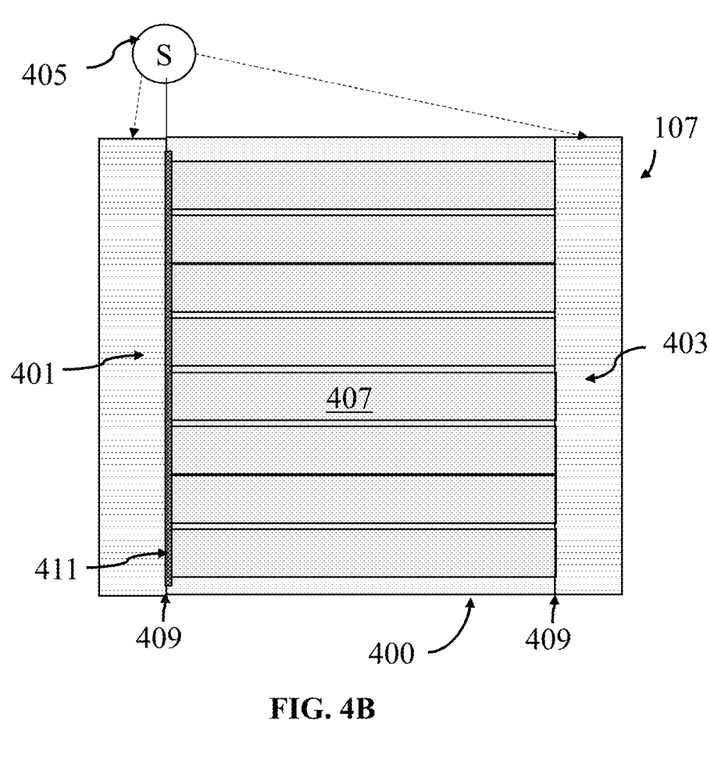

FIGS. 4A-4B is a top view and a side view illustrating an energy storage cell (or battery) packaging module 107 according to one embodiment. Module 107 includes a cell packaging chassis 400. Chassis 400 can be a fully sealed or partially sealed container with valve openings 409. Battery packaging module 107 can include battery cells 407 packaged therein. In one embodiment, chassis 400 can include packaging fluid valves 401 and 403 packaged on two sides of chassis 400. In one embodiment, fluid valves 401, 403 can represent fluid valves 201A-F, 203A-F of FIG. 2. In one embodiment, valves 401 and 403 are secured to acceleration channels of a cooling system container. In one embodiment, valves 401 and 403 are secured to corresponding valve openings 409 of chassis 400 and is different from fluid valves 201A-B, 203A-B that are secured to the channels, as shown by battery packaging modules 107A-F of FIG. 3. In one embodiment, valves 401 and 403 are absent from the battery packaging module, as shown by battery packaging modules 107G-L of FIG. 3. In some embodiments, fluid valves 401/403 are designed to fully cover valve openings 409 of chassis 401 or partially covering valve openings 409 of chassis 401.

In one embodiment, chassis 400 can include sensor 405 which is used to sense battery cell charging/discharging states for battery cells contained in chassis 400. For example, sensor 405 can detect when battery cells are inactive, or when battery cells are in a charging state or a discharging state. The sensor signal can be used to trigger a control to open/close fluid valves 401/403. In one embodiment, sensor 405 is configured to sense an electrical signal on electrical bus 411, and electrical bus 411 is coupled to battery cells 407.

Figure 5:
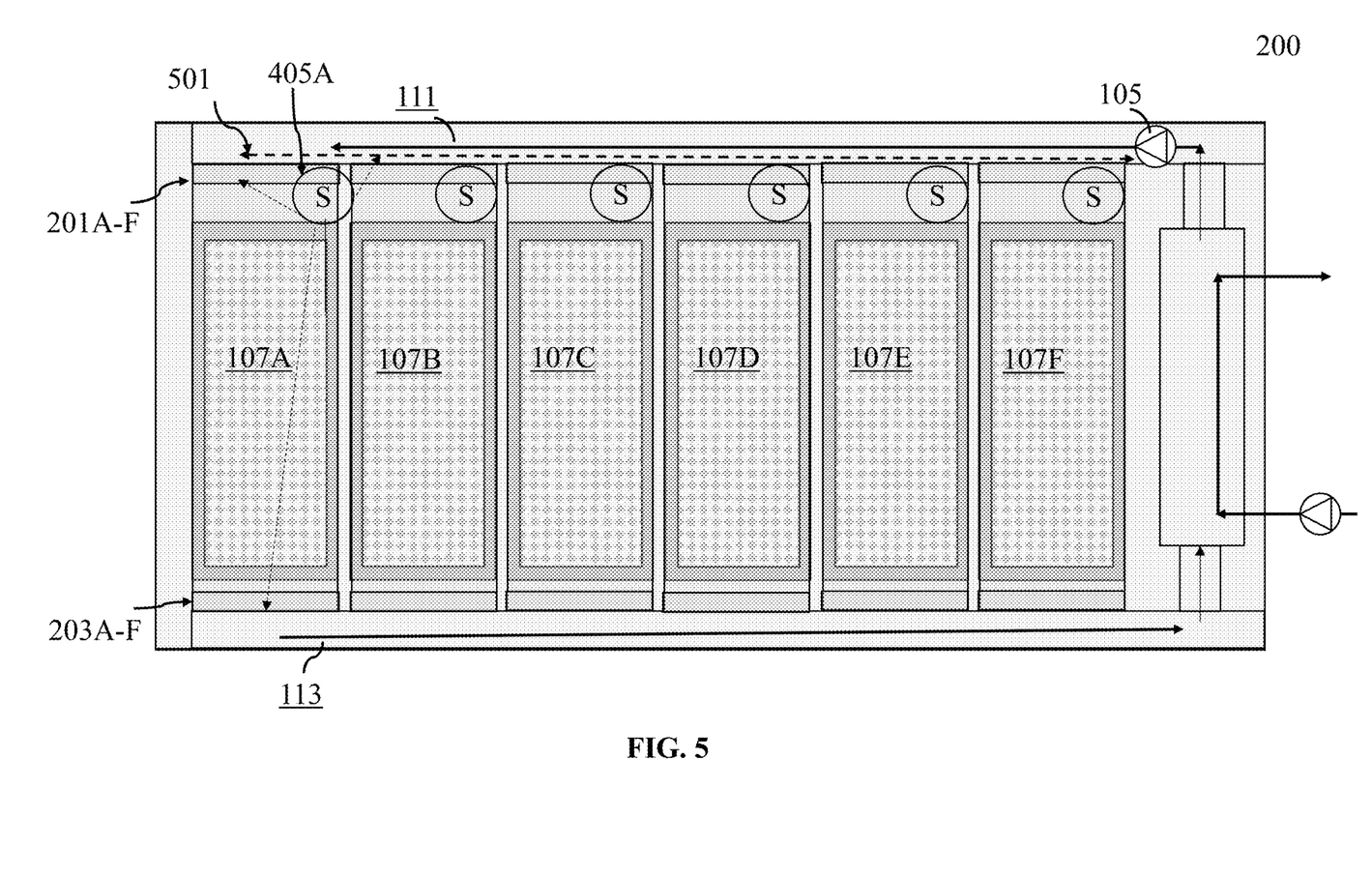
FIG. 5 is a block diagram illustrating a cooling system and associated communication and control systems according to one embodiment.

FIG. 5 is a block diagram illustrating a cooling system 200 and associated communication and control systems according to one embodiment. Cooling system 200 can include communication bus 501. Communication bus 501 can route sensor signals to pump 105 and valves 201A-F, 203A-F. In one embodiment, sensors 405, which is used to monitor the charging and discharging of the battery cells in battery packaging modules 107A-F, can be used to control the fluid valve and the pump 105. In one embodiment, there is one or more sensors 405 in each of the battery packaging modules 107A-F. The sensors can control fluid valves in corresponding battery packaging modules 107A-F and can control pump 105.

Figure 6:
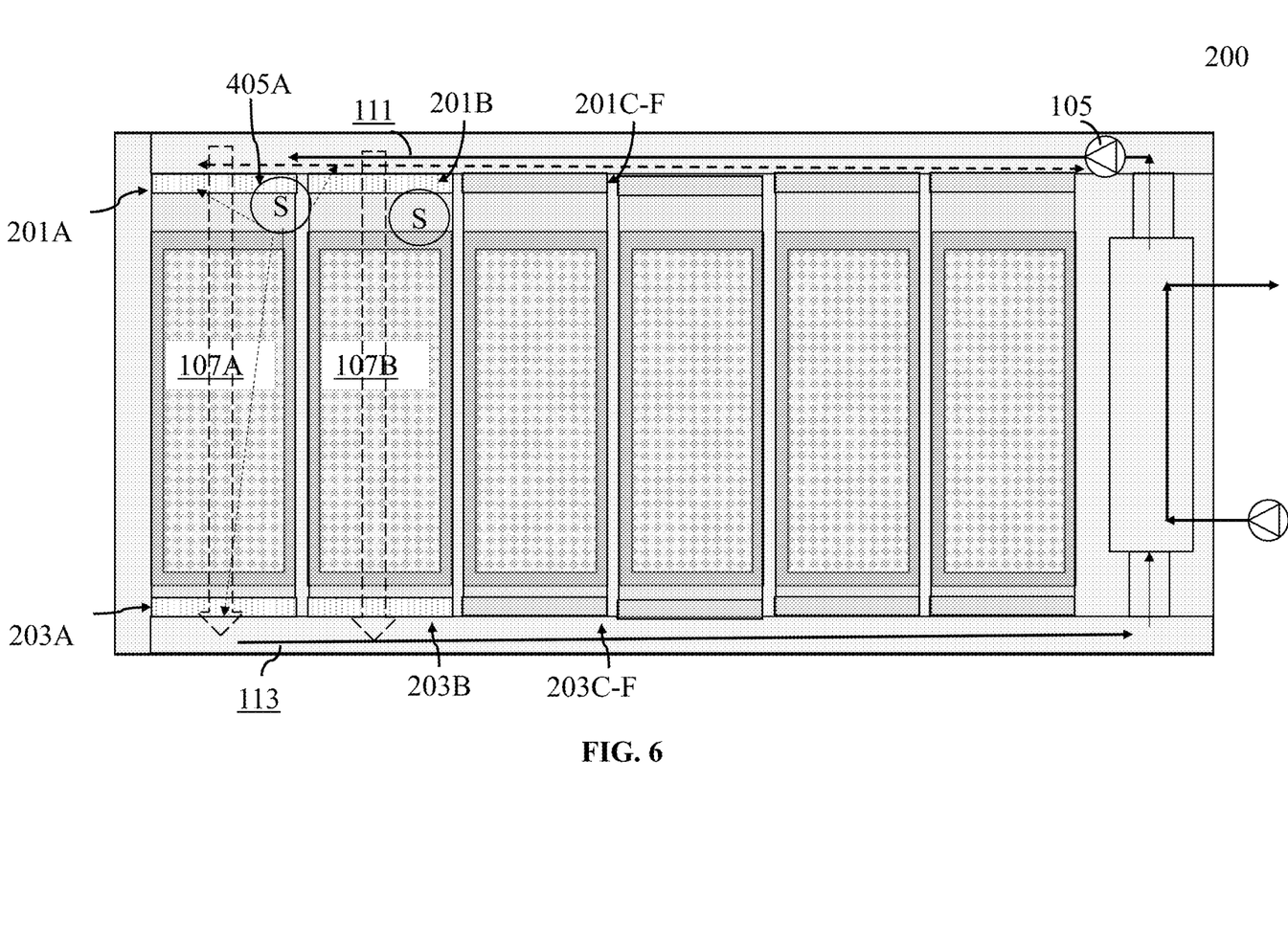
FIG. 6 is a block diagram illustrating a cooling system with two cell packages charging/discharging according to one embodiment.

FIG. 6 is a block diagram illustrating a cooling system 200 with two cell packages charging/discharging according to one embodiment. For example, when the battery cells in battery packaging modules 107A and 107B are in charging or discharging state, corresponding sensors of modules 107A-107B trigger valves 201A-201B, 203A-203B to open, and pump 105 to adjust a speed to adjust a flow rate of acceleration coolant passing through battery cells in modules 107A and 107B. At the same time, other battery cells are detected to be in an inactive state (notwithstanding the minimal self-discharge of battery cells) and valves 201C-F, 203C-F remain closed. In this design, battery cells of modules 107A-107B can be understood as charging/discharging at a same time or at overlapping different times. Note that all the packaging modules 107A-F are submerged in an immersion coolant 207 at all times, while the selective packaging modules 107A-B receive acceleration coolant 205 for thermal management acceleration.

Figure 7:
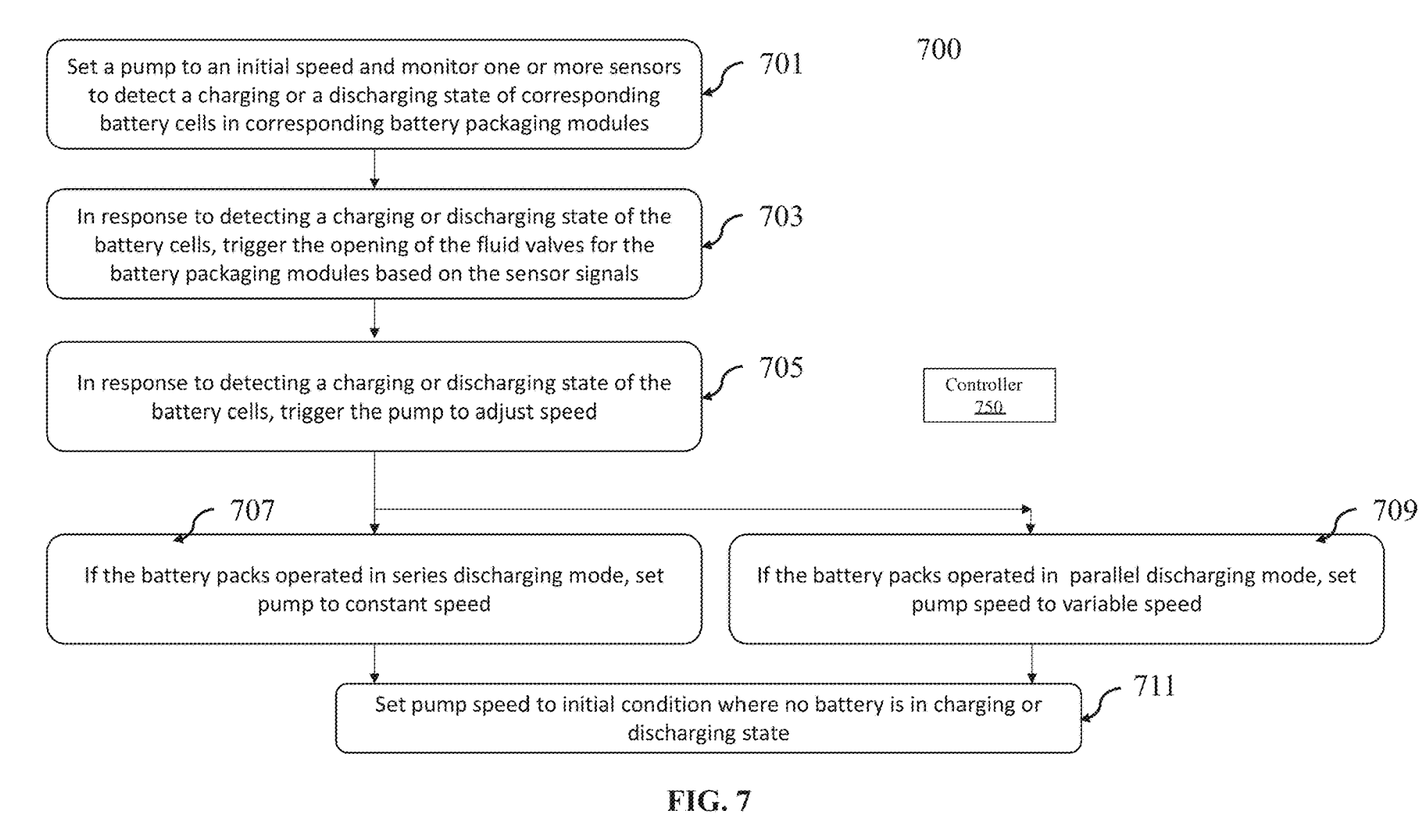
FIG. 7 is a flow diagram illustrating a method to operate a cooling system according to one embodiment.

FIG. 7 is a flow diagram illustrating a method to operate a cooling system according to one embodiment. In one embodiment, process 700 can be performed by processing logic of a controller 750 which may include software, hardware, or a combination thereof. Controller 750 can reside in any of cooling systems 100-200. In another embodiment, process 700 can be performed based on logic signals of sensors 405.

Referring to FIG. 7, at operation 701, processing logic sets a pump (such as fluid pump 105 of FIGS. 1-2) to an initial speed and monitor one or more sensors (sensor 405 of FIG. 4) to detect a charging or a discharging state of corresponding battery cells in battery packaging modules (such as modules 107A-F).

The sensors can be disposed on battery packaging modules 107A or on the battery cells contained therein. The charging or discharging state can correspond to detecting a power on an electrical bus (such as bus 411 of FIG. 4) of the battery packaging modules 107A.

At operation 703, in response to detecting a charging or discharging state of the battery cells, processing logic triggers the opening of the fluid valves (401-403 of FIG. 4) for the battery packaging modules based corresponding sensor signals.

For example, sensors can be directly coupled to corresponding fluid valves where a signal generated from the sensors can control the fluid valves to open/close.

In additional, for battery packaging modules 107A-F that are arranged in a parallel manner as that in FIG. 3, processing logic can trigger the opening/closing of the fluid valves that corresponds to the acceleration channels 111/113, e.g., fluid valves 201A-B, 203A-B.

At operation 705, in response to detecting a charging or discharging state of the battery cells, processing logic triggers the pump to adjust speed.

For example, pump 105 listens on the communication bus for a signal trigger by any of the sensors 405. The signal causes the speed of pump 105 to be adjusted from an initial speed to an acceleration speed.

At operation 707, if the battery cells operated in series charging/discharging mode, processing logic sets pump to constant speed.

Here, the charging/discharging mode can be predetermined when a cooling system is put into operation. For example, cooling system can have modules 107A-F arranged parallel to a flow direction of channels 111/113 (see FIG. 3). When the modules 107A-F are arranged in this manner, the battery packs are optimized to operate in a series manner and the battery packs are determined to operate in series charging/discharging mode. The constant speed can be a predetermined speed that accelerates the acceleration coolant to a prerequisite flow rate.

At operation 707, if the battery pack operated in parallel charging/discharging mode, processing logic sets pump speed to variable speed.

For example, cooling system can have modules 107A-F arranged perpendicular to a flow direction of channels 111/113 (see FIG. 2). When the modules 107A-F are arranged in the perpendicular manner, the battery packs are optimized to operate in a parallel manner and the battery packs are determined to operate in parallel charging/discharging mode. The variable speed of the pump can be directly proportional to the quantity of battery cells that are in the discharging/charging mode, e.g., power sensed on the electrical bus of modules 107A-F.

At operation 711, processing logic sets pump speed to initial condition where no battery is in charging or discharging state.

For example, if processing logic detects that the signals of the sensors indicate none of the battery packs in the battery packaging modules are in a discharging or charging state, processing logic sets the pump speed to the initial speed. Furthermore, the fluid valves can be triggered to close, either fully or partially covering the valve openings.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A battery cooling system, comprising:
   a coolant container;
   a plurality of battery packaging modules submerged in a first coolant fluid contained in the coolant container, wherein each of the plurality of battery packaging modules comprises:
   a cell packaging chassis having a pair of openings situated at opposing sides of the cell packaging chassis, and
   one or more battery cells housed in the cell packaging chassis;

a supply channel and a return channel to accelerate a second coolant fluid to at least a supply end and from at least a return end of any of the plurality of battery packaging modules; and a fluid pump disposed at the supply channel to accelerate the second coolant fluid supplied to any of the plurality of battery packaging modules.

2. The battery cooling system of claim 1, further comprising one or more pairs of fluid valves secured to the supply and return channels, each pair of fluid valves to control the second coolant fluid flowing through a subset of the plurality of battery packaging modules.

3. The battery cooling system of claim 2, wherein each of the plurality of battery packaging modules further comprises a sensor coupled to the one or more battery cells, wherein the sensor is configured to detect a discharge or a charge of the one or more battery cells to control a corresponding pair of fluid valves and an opening of the pair of fluid valves enables the second coolant fluid to pass through the one or more battery cells, wherein the sensor is further configured to control the fluid pump.

4. The battery cooling system of claim 1, wherein the fluid pump is operable at a constant speed or is operable at a variable speed that is proportional to a quantity of battery cells that are in a discharging or charging mode.

5. The battery cooling system of claim 4, wherein the fluid pump is operable at a constant speed if battery packs of the plurality of battery packaging modules are operating in series discharging or charging mode and the plurality of battery packaging modules correspond to a single server load, or the fluid pump is operable at the variable speed if battery packs of the plurality of battery packaging modules are operating in parallel discharging or charging mode and each of the plurality of battery packaging modules corresponds to one of a plurality of server loads.

6. The battery cooling system of claim 1, wherein the first coolant fluid is an immersion coolant and the second coolant fluid is a localized acceleration coolant localized to a respective battery packaging module activated to receive the localized acceleration coolant.

7. The battery cooling system of claim 1, wherein the plurality of battery packaging modules are arranged vertically and coolant flow directions of the plurality of battery packaging modules are perpendicular to flow directions of the supply and return channels.

8. The battery cooling system of claim 1, wherein a subset of the plurality of battery packaging modules are arranged horizontally and coolant flow directions of the subset of the plurality of battery packaging modules are parallel to flow directions of the supply and return channels.

9. The battery cooling system of claim 1, wherein a subset of the plurality of battery packaging modules are arranged horizontally and coolant flow directions of the subset of the plurality of battery packaging modules are perpendicular to flow directions of the supply and return channels, wherein battery cells in the subset of the plurality of battery packaging modules are configured to discharge in a sequence based on identifiers of the battery packaging modules in the subset.

10. The battery cooling system of claim 9, wherein during the discharge in the sequence, the fluid pump is operable at a constant speed and each of the subset of battery packaging modules are discharged one at a time.

11. The battery cooling system of claim 1, wherein the plurality of battery packaging modules are arranged in a two dimensional grid comprising one or more subsets of battery packaging modules, wherein each subset is arranged in a vertical manner, and each battery packaging module of the subset is arranged in a horizontal manner.

12. The battery cooling system of claim 1, wherein the plurality of battery packaging modules are operable to power server electronics of an information technology (IT) system or are operable as a backup power source for the server electronics.

13. The battery cooling system of claim 1, wherein each battery packaging module includes a corresponding set of packaging fluid valves secured to one or more openings of the cell packaging chassis of the battery packaging module.

* * * * *